United States Patent
Batllo et al.

(10) Patent No.: US 10,227,238 B2
(45) Date of Patent: Mar. 12, 2019

(54) PRODUCTION AND USE OF POLYSILICATE PARTICULATE MATERIALS

(75) Inventors: Francois Batllo, Burr Ridge, IL (US); Brian T. Holland, Oak Park, IL (US); John M. Krasniewski, Charlotte, NC (US); Kim M. Long, Naperville, IL (US); Michael A. Romba, Joliet, IL (US); Sascha Welz, Chicago, IL (US); David P. Workman, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 1857 days.

(21) Appl. No.: 11/397,134

(22) Filed: Apr. 4, 2006

(65) Prior Publication Data

US 2007/0231249 A1    Oct. 4, 2007

(51) Int. Cl.
| | | |
|---|---|---|
| *B01J 21/12* | (2006.01) | |
| *B01J 35/10* | (2006.01) | |
| *B01J 37/03* | (2006.01) | |
| *C09C 1/30* | (2006.01) | |
| *C01B 33/18* | (2006.01) | |
| *C01B 33/26* | (2006.01) | |
| *D21H 17/67* | (2006.01) | |
| *C01B 33/143* | (2006.01) | |
| *C01B 33/146* | (2006.01) | |
| *B82Y 30/00* | (2011.01) | |
| *B41M 5/52* | (2006.01) | |
| *A23L 2/80* | (2006.01) | |
| *D21H 17/68* | (2006.01) | |
| *D21H 19/38* | (2006.01) | |
| *D21H 19/40* | (2006.01) | |
| *D21H 21/52* | (2006.01) | |

(52) U.S. Cl.
CPC ............... *C01B 33/26* (2013.01); *A23L 2/80* (2013.01); *B01J 21/12* (2013.01); *B01J 35/1019* (2013.01); *B01J 35/1023* (2013.01); *B01J 35/1042* (2013.01); *B01J 35/1061* (2013.01); *B01J 37/03* (2013.01); *B41M 5/5218* (2013.01); *B82Y 30/00* (2013.01); *C01B 33/143* (2013.01); *C01B 33/146* (2013.01); *C01B 33/18* (2013.01); *C09C 1/3054* (2013.01); *D21H 17/675* (2013.01); *D21H 17/68* (2013.01); *D21H 19/385* (2013.01); *D21H 19/40* (2013.01); *C01P 2004/64* (2013.01); *C01P 2006/12* (2013.01); *C01P 2006/14* (2013.01); *C01P 2006/16* (2013.01); *D21H 21/52* (2013.01)

(58) Field of Classification Search
CPC ....... C01B 33/26; C01B 33/146; C01B 33/18; C01B 33/143; D21H 17/68; D21H 17/675; D21H 19/385; D21H 19/40; D21H 21/52; C09C 1/3054; B01J 21/12; B01J 35/1019; B01J 35/1023; B01J 35/1042; B01J 35/1061; B01J 37/03; A23L 2/80; B41M 5/5218; C01P 2006/14; C01P 2006/16; C01P 2004/64; C01P 2006/12

USPC .......................................................... 516/80
See application file for complete search history.

(56) References Cited

U.S. PATENT DOCUMENTS

| | | | | |
|---|---|---|---|---|
| 2,731,326 | A | * | 1/1956 | Alexander et al. ........... 423/338 |
| 2,750,345 | A | * | 6/1956 | Alexander ....................... 516/83 |
| 2,913,419 | A | * | 11/1959 | Alexander ....................... 516/80 |
| 4,217,240 | A | | 8/1980 | Bergna |
| 4,343,717 | A | | 8/1982 | Lok et al. |
| 4,385,961 | A | | 5/1983 | Svending et al. |
| 4,388,150 | A | | 6/1983 | Sunden et al. |
| 4,753,710 | A | | 6/1988 | Langley et al. |
| 4,927,498 | A | | 5/1990 | Rushmere |
| 4,988,659 | A | | 1/1991 | Pecoraro |
| 5,098,520 | A | | 3/1992 | Begala et al. |
| 5,182,062 | A | | 1/1993 | Regelsberger et al. |
| 5,196,177 | A | * | 3/1993 | Watanabe et al. ............ 423/335 |
| 5,221,648 | A | * | 6/1993 | Wachter ........................... 502/68 |
| 5,368,833 | A | | 11/1994 | Johansson et al. |
| 5,573,674 | A | | 11/1996 | Lind et al. |
| 5,688,482 | A | | 11/1997 | Saastamoinen |
| 5,840,158 | A | | 11/1998 | Choo et al. |
| 6,361,652 | B2 | | 3/2002 | Keiser et al. |
| 6,361,653 | B2 | | 3/2002 | Keiser et al. |
| 6,372,089 | B1 | | 4/2002 | Keiser et al. |
| 6,372,805 | B1 | | 4/2002 | Keiser et al. |
| 6,372,806 | B1 | | 4/2002 | Keiser et al. |
| 6,486,216 | B1 | | 11/2002 | Keiser et al. |

(Continued)

FOREIGN PATENT DOCUMENTS

| | | |
|---|---|---|
| EP | 0464289 A2 | 1/1992 |
| GB | 1 587 236 A | 4/1981 |

(Continued)

OTHER PUBLICATIONS

Lewis, Richard J., Sr. (2002) Hawley's Condensed Chemical Dictionary (14th Edition), John Wiley & Sons, Online @ http://knovel.com/web/portal/browse/display?_EXT_KNOVEL_DISPLAY_bookid=704&VerticalID=0, headwords = colloid chemistry; silicic acid; silica gel; sol; solution, colloidal; solution, true; (Knovel Release Date: Sep. 4, 2003;downloadJun. 18, 2011.*

(Continued)

*Primary Examiner* — Daniel S Metzmaier
(74) *Attorney, Agent, or Firm* — Leydig, Voit & Mayer, Ltd.

(57) ABSTRACT

A method of preparing a particulate material comprising the steps of adding silicic acid solution, optionally doped with aluminum, optionally added to a slurry of pre-existing nanoparticles at a neutral to slightly acidic pH of no more than seven, and at a temperature of about 20° to 30° C. This yields a polysilicate particulate dispersion. Then, the pH of the dispersion is raised to greater than seven, to stabilize/reinforce particles of the particulate dispersion. Optionally, the particles may be dried, and have increased porosity and surface area.

23 Claims, No Drawings

(56) References Cited

U.S. PATENT DOCUMENTS

| | | | |
|---|---|---|---|
| 6,569,908 | B2 | 5/2003 | Noguchi et al. |
| 6,632,489 | B1 | 10/2003 | Watanabi et al. |
| 6,872,685 | B2 | 3/2005 | Timken |
| 8,003,707 | B2 * | 8/2011 | Holland .................. 516/78 |
| 2001/0011105 | A1 * | 8/2001 | Noguchi ............. C01B 33/1465 516/81 |
| 2001/0023752 | A1 | 9/2001 | Keiser et al. |
| 2001/0030032 | A1 | 10/2001 | Keiser et al. |
| 2003/0139517 | A1 | 7/2003 | Nyander et al. |
| 2004/0092390 | A1 | 5/2004 | Timken |
| 2005/0004236 | A1 | 1/2005 | Workman et al. |
| 2005/0113462 | A1 | 5/2005 | Persson et al. |
| 2005/0178070 | A1 * | 8/2005 | Workman et al. ............. 51/307 |
| 2005/0234136 | A1 * | 10/2005 | Holland et al. .............. 516/80 |
| 2008/0108497 | A1 * | 5/2008 | Holland .................. 501/154 |
| 2010/0068519 | A1 * | 3/2010 | Holland et al. ............. 428/402 |
| 2010/0104500 | A1 * | 4/2010 | Holland .................. 423/704 |

FOREIGN PATENT DOCUMENTS

| | | | |
|---|---|---|---|
| JP | 2004203729 A | * | 7/2004 |
| WO | 91/07350 | | 5/1991 |
| WO | WO 00/66491 A1 | | 11/2000 |
| WO | WO 00/75074 A1 | | 12/2000 |

OTHER PUBLICATIONS

Machine Translation of Publ. No. JP 2004203729 A, published Jul. 2004, Japan patent Office, Tokyo, Japan, obtained online @ http://dossier1.ipdl.inpit.go.jp/AIPN/odse_top_dn.ipdl?N0000=7400 , pp. 1-17.*

Iler, "The Chemistry of Silica," Hoboken, NJ, John Wiley & Sons, Inc., 1979, pp. 407-411.

Iler, "Multilayers of Colloidal Particles," *J. of Colloid and Interface Science*, 21(6), Jun. 1966, pp. 569-594.

Kim et al., "Comparison of the Properties of Silica Fine Particles Prepared by Using Batch and Semibatch Process," *J. of the Korean Institute of Chem. Engineers*, 39(3), Jun. 2000, pp. 398-404.

Koros et al., "Terminology of Membranes and Membrane Processes," *J. of Membrane Science*, 120, 1996, pp. 149-159.

Maciel et al., "Multinuclear NMR Studies of Silica Surfaces," *Colloidal Silica*, ed. by H. Bergna, 2006, pp. 425, 450-451.

Mel, "Separations: Mechanical, *Encyclopedia of Chemical Engineering Equipment*," downloaded from http://encyclopedia.che.engin.umich.edu/Pages/SeparationsMechanical/SeparationsMechanical.html on Apr. 21, 2015, 2 pp.

Potapov et al., "Research on the Use of Silica Extracted from the Hydrothermal Solutions," *Stanford Geothermal Workshop*, Jan. 1 to Feb. 1, 2012, 8 pp.

Potapov et al., "Silica Sols Production by Membrane Concentration of Hydrothermal Solutions," *Stanford Geothermal Workshop*, Feb. 1-3, 2010, 7 pp.

Roberts, "Manufacturing and Applications of Water-Borne Colloidal Silica," *Colloidal Silica*, 2006, pp. 131,146-148, ed. By H. Bergna.

* cited by examiner

PRODUCTION AND USE OF POLYSILICATE PARTICULATE MATERIALS

BACKGROUND OF THE INVENTION

Finely divided silica is used as a catalyst support, as a binder, or as a catalyst itself, especially when "doped" with aluminum or another metal, as an ink-receptive coating on paper or the like, as a filter material for wine or juice clarification, or the like. However, improvements could be obtained if the agglomerated silicate particles could have a greater porosity than can be obtained using standard colloidal silica. Also, when colloidal silica or other silicates are modified by the incorporation of aluminum into the silicate framework, known benefits are achieved such as increased acidity, but such materials have a strong tendency to form a gel, which is disadvantageous.

If a physically stable, silica-alumina (alumino-silicate) material could be provided, improvements can be obtained in a number of markets including catalysts, refractories, separation materials such as filters, abrasives, and coatings. The present materials used are not as homogeneous or amorphous as might be desired.

By this invention, a high surface area, high porosity, particulate material is provided, having promising characteristics for uses as described above, and exhibiting improved physical stability. Specifically, the finely dispersed alumino-silicate materials of this invention can have high natural acidity coupled with good physical stability to avoid gelling, providing particular promise for use as a catalyst per se, or as a catalyst support upon which a metal or metal oxide catalyst may be placed, for example, platinum, palladium, nickel, copper oxide, or other materials.

DESCRIPTION OF THE INVENTION

By this invention, a method is provided for preparing a particulate material, comprising the steps of:

mixing a silicic acid solution, optionally doped with a metal or metals such as aluminum, with pre-existing nanoparticles at a neutral to slightly acidic pH of no more than 7, at a temperature of about 20° to 130° C., to produce polysilicate linkages forming between the pre-existing nanoparticles, yielding a dispersion having a solids content of at least about five percent $SiO_2$ by weight. Thereafter, the pH of the resulting dispersion is adjusted to greater than seven to provide alkali conditions, to stabilize/reinforce the particulate material, if desired. Following this, the material may be dried, if desired, for example to form a dry catalyst or catalytic support material.

In some embodiments, the silicic acid solution may be substantially free of aluminum and other metals which are not alkali metals. If desired, a small amount of alkali metal such as sodium or potassium may be initially present, but not enough in the first stage of treatment as described above to cause the mixture to have a pH of greater than seven.

The finished product may, as a further step, have a metal or metal oxide coating applied to the product by a conventional technique, to provide a catalyst. The product may be used as a catalyst, as a binder, or a catalyst support, in a chemical reaction such as a hydroprocessing reaction or the like.

In some embodiments, a method may be provided for preparing a particulate material which comprises the steps of mixing an aluminum-doped silicic acid solution with a slurry of pre-existing nanoparticles having a neutral to slightly acidic pH of no more than seven, at a temperature of about 20° to 130° C., to produce polyaluminosilicate linkages to form between the pre-existing nanoparticles, yielding a particulate dispersion. Then, the pH of the dispersion is raised to greater than seven, to stabilize/reinforce particles of the particulate dispersion.

The silicic acid solution may be added to the slurry of pre-existing nanoparticles, for example in the "heel" (original liquid volume) of the reaction mixture. Alternatively, the nanoparticles may be added to the silicic acid solution.

In some embodiments, a method may be provided for preparing a particulate material which comprises the steps of subjecting an aluminum-doped silicic acid solution to a neutral or slightly acidic pH of no more than seven, at a temperature of about 20° to 130° C., without pre-existing nanoparticles, to produce a polyalumino-silicate product as a particulate dispersion. Then, as before, the pH of the dispersion is raised to greater than seven, to stabilize/reinforce the particles that have formed in the dispersion.

In the above cases, the silicic acid solution, whether by itself or mixed with a slurry of pre-existing nanoparticles, and at neutral to slightly acidic pH (i.e. no more than seven) will undergo chemical condensation forming silicate linkages, incorporating the pre-existing nanoparticles if present, yielding a dispersion of particles which are weblike in characteristic and growing in number, with the pre-existing nanoparticles, when present, being incorporated into the web-like, particulate material.

Then, upon raising of the pH to greater than seven, i.e. alkaline conditions, the condensation process shifts to primarily cause growth of the individual, web network without the formation of new web particles, so that the particles present in the web-like, particulate dispersion are stabilized/reinforced by growing in bulk, rather than significantly in number.

In some embodiments, the aluminum, when present, can be present within a range of about 10 to about 60 weight percent of total solids, the aluminum being calculated as $Al_2O_3$.

The pre-existing nanoparticles, if present, may comprise silica, titanium oxides, aluminum oxides, iron oxides, zinc oxides, clays, zirconium oxides, tin oxides, cerium oxides, and mixtures thereof, as well as other metal oxides and the like as may be desired. As stated, this invention, these discrete nanoparticles are linked together in web-like structures which have high surface area, high porosity, and capability to absorb, adsorb or chemisorb appropriate materials, because of the high internal and external surface areas, porosity, and chemical reactivity.

In some embodiments, the pre-existing nanoparticles may range in size from about 3 nm to about 300 nm, particularly about 15 nm to about 250 nm in presently preferred embodiments.

In certain embodiments, the solids content of the agglomerated material in a liquid carrier, after the particles have been stabilized/reinforced as described above, is within the range of about three percent to about 25 percent by weight.

In the second pH adjustment step, in some embodiments of the method, the pH is raised to about 7.5 to 10. The alkali compound used to raise the pH is not critical in nature, and may typically comprise sodium hydroxide, potassium hydroxide, lithium hydroxide, ammonium hydroxide, various amines, mixtures thereof, and the like.

As previously described, a metal or metal oxide coating may be added by known means to the particle agglomerate of this invention, in liquid or vapor phase, particularly for use as a catalyst or catalyst support.

The pre-existing nanoparticles may comprise colloidal silica if desired, for example colloidal silica types such as uncoated silica; aluminum oxide-coated silica; and cerium oxide-coated silica. and silica coated or doped with other metals and the like.

Control of particle parameters (particle size, porosity and surface area) can be achieved through manipulation of at least three synthetic factors. These factors are (1) size and concentration of pre-existing particles, (2) time of growth at pH<7 and (3) time of growth at pH>7. Adjustment of the relative ratio of each factor allows for production of "tunable properties".

During the low pH growth phase, extensive nucleation is occurring in the silica polymerization creating the web-like structure. This web like structure provides high surface area and high porosity.

In contrast, high pH conditions favor growth on existing surfaces, and not further nucleation. Subsequent growth on existing surfaces strengthens and reinforces the network. As a result, the strengthened linkages are less prone to collapse during drying, and retain their open structure (and high surface area and porosity).

The synthetic process can be monitored using particle-sizing techniques. The measured particle size growth is fast during the low pH stage. However, after the pH adjustment to pH>7 the particle size growth is much slower.

Basically, by this invention, the second, pH adjustment step may be delayed, while nucleation and multiplication of silica particles proceeds to any desired degree short of gelation, which will usually eventually take place under the acidic conditions. Then, at some time before gelation, the second, pH adjustment step may take place in which the pH is raised above seven, so that, by this invention, subsequent growth on existing surfaces strengthens and reinforces the network.

Description of Specific Embodiments

The nanoparticles may comprise stable particles of a size of, typically, about 3 to about 300 nm diameter, being substantially round in shape in some embodiments (i.e. pebble like). However, plate-like nanoparticles may be used, having a comparable major dimension to the diameters of the round nanoparticles, i.e. about 3-300 nm. Also, string-like nanoparticles, typically of comparable size to the previous nanoparticles, may be used.

As stated, nanoparticles of clay such as laponite may be used. An example of a flat particle material would be an alumina such as boehmite. Thus, it can be seen that the nanoparticles can be of any shape, being generally of a dimension of no more than about 300 nm., typically no more than 250 nm.

By this invention, a particulate dispersion of particles, each representing a stable network is provided, being useable in a number of desirable uses as described above. For example, the particles of the particulate material prepared in accordance with this invention may comprise a catalyst, a binder, or a catalyst support, having improved surface area, porosity, and stability. Particularly, the aluminum-doped particulate material may be desirable for this purpose, having a natural acidity.

Additionally, a particle agglomerate of this invention in a generally conventional liquid carrier may be conventionally applied to a substrate such as paper or the like for use in an ink printing device such as an ink jet printer. The paper substrate may be provided with one or more particle agglomerates of this invention thus prepared and placed in a conventional liquid carrier, being applied to the surface of the paper and dried, to provide a paper which is desirably usable in such an ink printing device. Thus, the material of this invention may be formed into an ink-receptive coating for application to such a substrate, by coating it onto at least a portion of the substrate, such as paper or cardboard.

Similarly, In another type of use, wine or juice may be clarified by a method comprising the steps of: providing a liquid to be clarified, preparing a particle agglomerate according to a method like that described herein, bringing into contact the wine or juice and the agglomerate, and thereafter separating the agglomerate from the wine or juice. As is known, undesirable components of the wine or juice which reduce clarity may thus be removed. The particle agglomerate may be held in a chamber such as a filter, and the wine and juice passed through it, with improved results.

In some embodiments, a method may be provided of preparing a particulate material comprising the steps of: providing an aluminum-containing silicic acid solution having a neutral to slightly acidic pH, at a temperature of about 20° to 130° Centigrade, to produce polyaluminosilicate linkages formed in the material, to yield a particulate dispersion. It is optional whether or not nanoparticles, as described above, are present. Whether nanoparticles are present or not, the aluminum-containing silicic acid solution will condense to form particles in which the particles are in a network form.

Then, the pH is raised to greater than 7, to stabilize/reinforce these network particles of the particulate dispersion.

It should be noted that particulate dispersions can be prepared with only the first step of condensation at slightly acidic pH, without a step of raising the pH of the dispersion to greater than 7. However, especially in the case of aluminum-containing silicic acid solutions, such materials are physically unstable in the absence of the stabilizing/reinforcing step at a pH of greater than 7. The particulate dispersion, in the absence of such a stabilizing/reinforcing step, will generally form a gel, which is viscous and difficult to handle, being undesirable to obtain the advantages of this invention.

In some embodiments of the inventions described above, the aluminum may be present in a mole ratio of about 1:1 to 1:200 of the silica present, calculated respectively as $Al_2O_3$ and $SiO_2$. Such a material may comprise a catalyst, a binder or a catalyst support.

Specifically, the pre-existing nanoparticles described above may in some desired embodiments comprise substantially solid spheres of silica. The term "spheres" is intended as a general term to describe pebble-like particles that are of approximately similar dimension in all directions.

The nanoparticles can be added at any point during the synthesis process, typically to the acid sol or to the "heel" of the reaction mixture.

It should be understood that the aluminum incorporated in the material of this invention may be so incorporated as $AlO_4$. The material of this invention may be formed from different sources of aluminum such as aluminum nitrate, aluminum chloride, aluminum phosphate, aluminum chlorohydrate, or the like, with resulting changes in composition and properties of the final product.

Thus, by this invention, sub-micron sized, network materials of a highly homogenous alumino-silicate composition are disclosed, being formed by a new route that results in stabilized particles that do not deteriorate into a gel. These materials may be made with or without pre-existing nanoparticles, thus providing a way to vary the properties of the product of this invention. The process can utilize current manufacturing capabilities, both in terms of raw materials and equipment, and the product may be dried. Surface acidity of the alumino-silicate product can be modified by adjusting the silica to alumina ratio in the silicic acid solution. Porosity and surface area of the material formed by the processes of this invention can be controlled by adjustments in the concentration of the pre-existing nanoparticles, as well as the amount of alumino-silicate or pure silicate particulate material.

The above disclosure and the examples below have been offered for illustrative purposes only, and are not intended to limit the scope of the invention, which is as defined in the claims below.

In various experimental runs shown below, aluminum doped silicic acid was prepared by cationic exchange of approximately six weight percent solution of chilled sodium silicate, prepared by diluting 600 ml of sodium silicate solution to 3 liters with deionized water. The dilute sodium silicate solution was deionized with Dowex Monosphere 650-H resin of acid form into a 1:2 ratio of resin:solution ratio in a column. The resin in the column was first flushed with deionized water, and the dilute sodium silicate solution was then passed through the column. When the effluent became acidic, signifying the presence of silicic acid sol, the effluent was collected. The resulting acid sols had specific gravities in the range of 1.0362-1.0380, corresponding to $SiO_2$ concentrations of 5.84%-6.23%. The aluminum salt used for the aluminum doping was then added either in the form of aluminum chlorohydrate or aluminum nitrate, being added to the acid sol at various concentrations, based on $SiO_2$ present.

The laboratory reactors used were 1 or 5 liter, 3-neck, round bottom flasks. The reactors were first soaked in 0.5 Normal Caustic Soda to remove any $SiO_2$ residue, and then rinsed to neutrality with deionized water. These flasks were stirred with standard, uncalibrated lightening mixers. A thermocouple was passed through one side neck, while the opposing neck housed the addition hose for the acid sol. The addition of the aluminum-doped acid sol was performed with a peristaltic pump at a predefined rate from a chilled reservoir.

Example 1

In this particular example, the aluminum-doped silicic acid was prepared using 88.6 grams of aluminum chlorohydrate, added to 1160 grams of 7% silicic acid sol, made as above.

There was added to a reaction flask 1000 ml of deionized water, which was heated to 90° C. The aluminum-doped acid sol was added via a peristaltic pump at the rate of 4.6 ml/minute for two hours and the pumping was suspended for 15 minutes. After the 15 minutes, the pH of the reaction mixture was raised to about pH 9, with the addition of 50 ml of concentrated ammonium hydroxide. Addition of the aluminum-doped silicic acid feed was resumed, until 130 grams of added aluminum-doped silicic acid was fed into the system. During this time, the pH was periodically monitored, and an additional amount of 20% ammonium hydroxide was added to maintain the pH of the material above 9.5. The total addition time was approximately three hours.

The reaction was heated at 90° C. for an additional hour, after completing the aluminum-doped silicic acid feed, to ensure a complete reaction. The reaction mixture was then allowed to cool, with continuous stirring.

The resulting product was determined to contain 25 wt. percent of $Al_2O_3$, based on the silica ($SiO_2$) present, corresponding to a mole ratio of $SiO_2:Al_2O_3$ of 7 to 1.

Nitrogen sorption measurements to determine surface area and porosity were performed with an Autosorb-IC unit from Quantachrome. Each sample was calcined after drying and then degassed for three hours at 300° C. Each sample was characterized by a multi-point BET surface area, total pore volume, and BJH adsorption pore size distribution. Chemisorption via $NH_3$ temperature programmed sorption was also run on select samples using the same instrument.

Transmission electron microscopy was performed to determine microtexture and particle shape. The samples were characterized by powder x-ray diffraction and x-ray energy dispersive spectroscopy, Z-contrast imagining, and electron energy-loss spectroscopy in a field emission gun scanning transmission electron microscope.

Physical data from these and other tests indicated a surface area of 359 square meters per gram; a pore volume of 0.87 cc/gm; and a pore diameter of 97.8 angstroms.

Example 2

The experiment of Example 1 was repeated, in which a polyaluminosilicate was prepared in a manner similar to Example 1, but containing 34 weight percent of $Al_2O_3$, based on the silica present, and a $SiO_2:Al_2O_3$ mol ratio of 4.99.

In this embodiment, similar tests to Example 1 indicated a surface area of 238 square meters per gram, a pore volume of 0.95 cc/gm, and a pore diameter of 160 angstroms.

COMPARATIVE EXAMPLE 3

The experiment of Example 1 was repeated, the aluminum-doped acid sol being prepared with 100.28 grams of aluminum chlorohydrate, added to 1,286 grams of 4.9% acid sol, prepared as previously described. A "heel" was prepared by adding 750 ml of deionized water into a reaction flask, and heated to 90° C. The aluminum-doped acid sol was added via peristaltic pump at a rate of 5.0 ml per minute, until the entire amount of acid sol was fed. No pH adjustment was made during the reaction, so that conditions remained on the acid side. The reaction mixture became very viscous during sol addition, indicating gelling. It was allowed to cool after addition of all of the acid sol, with continuous stirring. No alkali was added to bring the pH to the alkali side during the process.

In this system, the percentage of $Al_2O_3$, based on the silica present, was 37.7 weight percent. The mol ratio of $SiO_2$:$Al_2O_3$ was 4.5. The surface area was calculated to be 177 $M^2/g$, which is well below the surface areas of the previous two examples; a pore volume of 0.14 cc/gm, which is also well below the previous examples, and a pore diameter of 32.5 angstroms, also well below the first two examples.

We believe that the difference in results is a result of the lack of a "flip" of the process to alkali conditions, as was performed in the previous two examples.

Example 4

Another experiment similar to Example 1 was performed, except that the percent of $Al_2O_3$ to silicate present was 10%, and the $SiO_2:Al_2O_3$ mol ratio was 16.97.

The particles of the resulting particulate material were measured with a surface area of 537.7 $M^2/g$, a pore volume of 0.84 cc/gm, and a pore diameter of 62.6 angstroms.

Example 5

The procedure of Example 1 was performed, but using proportions so that the percentage of $Al_2O_3$, based on the silica present, was 8.76%, with a $SiO_2:Al_2O_3$ mol ratio of 19.37. The particulate material thus formed was measured to have a surface area of 560.6 $M^2/g$; a pore volume of 0.96 cc/gm, and a pore diameter of 68.7 angstroms.

Example 6

The process of Example 1 was repeated, but using reaction conditions so that the percentage of $Al_2O_3$, based on the silica present, was 6.35 weight percent and the $SiO_2:Al_2O_3$ mol ratio was 26.73. In this circumstance, the surface area was calculated as 533.4 $M^2/g$; a pore volume of 1.07 cc/gm; and the pore diameter of 79.9 angstroms.

Example 7

The process of Example 1 was repeated, but under circumstances so that the percentage of $Al_2O_3$, based on the silica present, was 2.35 with an $SiO_2:Al_2O_3$ mol ratio of 72.22.

In this circumstance, the surface area of the particulate product was calculated to be 581.1 $M^2/g$, with a pore volume of 0.46 cc/gm, and a pore diameter of 31.9 angstroms.

Example 8

The process of Example 1 was repeated, but without the addition of any aluminum, so that the particulate product was pure silica. The resulting product had a surface area calculated at 230 $M^2/g$, with a pore volume of 0.94 cc/gm, and a pore diameter of 169 angstroms.

It can be seen that superior results are obtained with all of the examples above, when compared with Comparative Example 3, which is the only example where there is no "flip" to alkaline conditions during the particulate growth process.

Example 9

This Example illustrates the incorporation of substantially two dimensional nanoparticles into a three dimensional network.

150 ml of deionized water were placed in a reaction vessel and heated to 60° C. Then, 180 grams of silicic acid containing 22 grams of preexisting aluminum oxide nanoparticles comprising boehmite nanoparticles (being substantially two dimensional). The nanoparticles were added gradually to the water with stirring. After this addition, 20 wt. percent of sodium hydroxide, based on the silicic acid, was added to bring the pH to the alkali side. Thereafter, another 180 grams of silicic acid containing 22 grams of the aluminum oxide (boehmite) were added.

The reaction mixture was maintained at 60° C. for four hours, with stirring continued.

The final product was filtered, and provided a high surface area, high pore volume, particulate material. The surface area was 258 $m^2/gm$ and the pore volume was 0.43 cc/gm. The pore diameter was 67.4 angstroms. The material is particularly suited for formulation into a paper coating material.

It can be seen that the boehmite nanoparticles used in this example are doped into the silicic acid reactant. In some embodiments, desirable products can be made with a later addition of nanoparticles.

Example 10

In this particular example, the silicic acid is not doped with aluminum. The silicic acid was prepared by cationic exchange of approximately 4.5 weight percent solution of chilled sodium silicate, prepared by diluting 600 ml of sodium silicate solution to 4 liters with deionized water. The diluted sodium silicate was deionized with Dowex Monosphere 650-H resin of acid form into a 1:2 ratio of resin: solution ratio in a column. The resin in the column was first flushed with deionized water, and the diluted sodium silicate solution was then passed through the column. When the effluent became acidic, signifying the presence of silicic acid, the effluent was collected.

There was added to a reaction flask 171 ml of deionized water and 28.9 g of a 34.5% deionized solution of preexisting silica nanoparticles of about 20 nm in diameter. This solution was heated to 90° C. The silicic acid was then added via a peristaltic pump at the rate of 0.8 ml/minute for about 3.5 hours. The pumping was suspended for 15 minutes. After the 15 minutes, the pH of the reaction mixture was adjusted to above 7, with the addition of 2 ml of concentrated ammonium hydroxide. Addition of the silicic acid feed was resumed until a total of about 350 grams of added silicic acid was fed into the system. The total addition time was approximately 7.5 hours.

The reaction was heated at 90° C. for an additional hour, after completing the silicic acid feed, to ensure a complete reaction. The reaction mixture was then allowed to cool, with continuous stirring.

Physical data from these and other tests indicated a surface area of 185 square meters per gram; a pore volume of 0.58 cc/g; and a pore diameter of 125 angstroms.

For materials such as Example 10, experiments were conducted varying the relative percentages of silica present as pre-existing nanoparticles, the amount of silicic acid added at low (acid) pH, and the amount of silicic acid added under alkaline conditions. The surface area and pore volumes were found to correlate with the percentage of silica added as silicic acid during the low pH phase. For example keeping the fraction of silica for pre-existing nanoparticles constant (77%) while increasing the fraction of silicic acid fed at low pH from 8.8% to 15.7%, this increased the surface area from 150 to 190 $m^2/g$, with a corresponding increase in pore volume from 0.31 cc/g to 0.42 cc/g.

Example 11

In this particular example, the final agglomerated material from Example 10 is coated with boric acid stabilized basic aluminum acetate.

The agglomerated material was first concentrated to a sol of approximately 15 wt. percent solids. The sol was then deionized with Dowex Monosphere 650-H resin of acid form with a 1:2 ratio of resin:solution ratio in a column. When the effluent became acidic, signifying the presence of deionized agglomerate, the effluent was collected. The Zeta potential of this material is approximately −10 MV at pH 4. To 100 g of the effluent was added about 3 g concentrated acetic acid solution to stabilize the material at pH 3.

This effluent was added to a reaction flask 85 g of a 25 wt. percent freshly prepared solution of basic aluminum acetate.

The deionized solution was added to the flask via a peristaltic pump at the rate of 4.0 ml/minute.

The zeta potential of the resulting solution was found to be about +30 mV at a pH of 4.

Example 12

In this particular example, the silicic acid is doped with aluminum, and the preexisting particles in the heel are also doped with aluminum. The doped silicic acid is prepared per the process of Example 1, but under circumstances such that the percentage of $Al_2O_3$, based on the silica present, was 10 wt. percent, with an $SiO_2$:$Al_2O_3$ mol ratio of 17.0.

There was added to a reaction flask of 914 ml of deionized water and 286 g of a 21 wt. % deionized solution of preexisting silica nanoparticles of about 8 nm in diameter. These were grown such that the percentage of $Al_2O_3$, based on the silica present in the particles, was 2, with an $SiO_2$:$Al_2O_3$ mol ratio of 84.8.

This solution was heated to 90° C. The doped silicic acid was then added via a peristaltic pump at the rate of 10 ml/minute for about 1.0 hour. The pumping was suspended for 15 minutes. After the 15 minutes, the pH of the reaction mixture was adjusted to above 9, with the addition of 30 ml of concentrated ammonium hydroxide. Addition of the doped silicic acid feed was resumed until a total of about 1543 grams of doped silicic acid was fed into the system. The total addition time was approximately 2.5 hours.

The reaction was heated at 90° C. for an additional hour, after completing the doped silicic acid feed, to ensure a complete reaction. The reaction mixture was then allowed to cool, with continuous stirring.

Physical data indicated a surface area of 650 square meters per gram; a pore volume of 0.59 cc/g; and a pore diameter of 36 angstroms.

What is claimed is:

1. A method of preparing a particulate material comprising:
   (a) creating a particulate dispersion from a mixture comprising a silicic acid solution and nanoparticles, wherein the mixture is maintained at a pH of no more than 7 and at a temperature of from about 20° C. to about 130° C. during creation of the particulate dispersion;
   (b) increasing the pH of the particulate dispersion created in step (a) to a pH of from about 9 to 10;
   (c) adding silicic acid into the particulate dispersion while the particulate dispersion is at a pH of from about 9 to 10; and
   (d) reacting particles in the particulate dispersion with silicic acid added in step (c) while the particulate dispersion is at a pH of from about 9 to 10 to provide a dispersion of particulate material.

2. The method of claim 1, wherein the nanoparticles comprise silica.

3. The method of claim 2, wherein the silica comprises colloidal silica.

4. The method of claim 3, wherein the colloidal silica is selected from uncoated colloidal silica, aluminum oxide coated colloidal silica, aluminum doped colloidal silica, cerium oxide coated colloidal silica, or a combination thereof.

5. The method of claim 3, wherein the colloidal silica has an average particle size of from about 3 nm to about 150 nm.

6. The method of claim 1, wherein the nanoparticles are selected from silica, titanium oxide, iron oxide, zinc oxide, zirconium oxide, tin oxide, cerium oxide, or a combination thereof.

7. The method of claim 1, wherein the nanoparticles have an average particle size of from about 3 nm to about 300 nm.

8. The method of claim 7, wherein the nanoparticles have an average particle size of from about 15 nm to about 250 nm.

9. The method of claim 1, wherein the dispersion of particulate material has a solids content of from about 3% to about 25% by weight.

10. The method of claim 1, wherein the pH of the dispersion of particulate material is increased in step (b) via the addition of an alkali compound selected from sodium hydroxide, potassium hydroxide, lithium hydroxide, ammonium hydroxide, an alkali amine, or a combination thereof.

11. The method of claim 1, further comprising drying the dispersion of particulate material provided by step (d).

12. The method of claim 1, further comprising coating the particulate material with a metal, a metal oxide, or mixture thereof.

13. The method of claim 1, wherein the particulate material has a specific surface area of from 230 m2/g to 650 m2/g.

14. The method of claim 13, wherein the particulate material has a specific surface area of from about 350 m2/g to 650 m2/g.

15. A method of preparing a particulate material comprising:
   (a) creating a particulate dispersion from a mixture comprising a silicic acid solution and aluminum oxide, wherein the mixture is maintained at a pH of no more than 7 and at a temperature of from about 20° C. to about 130° C. during creation of the particulate dispersion;
   (b) increasing the pH of the particulate dispersion created in step (a) to a pH of from about 9 to 10;
   (c) adding silicic acid into the particulate dispersion while the particulate dispersion is at a pH of from about 9 to 10; and
   (d) reacting particles in the particulate dispersion with silicic acid added in step (c) while the particulate dispersion is at a pH of from about 9 to 10 to provide a dispersion of particulate material.

16. The method of claim 1, wherein step (a) further comprises adding aluminum oxide into the mixture.

17. The method of claim 16, wherein step (c) further comprises adding aluminum oxide into the particulate dispersion.

18. The method of claim 17, wherein the aluminum oxide is present in the dispersion of particulate material at a concentration of from about 10 to about 60 weight percent of total solids, calculated as $AlO_3$.

19. The method of claim 17, wherein the nanoparticles comprise silica.

20. The method of claim 19, wherein the silica comprises colloidal silica.

21. The method of claim 20, wherein the pH of the particulate dispersion is increased in step (b) via the addition of ammonium hydroxide.

22. The method of claim 15, further comprising (e) allowing the dispersion of particulate material to cool.

23. The method of claim 1, further comprising (e) allowing the dispersion of particulate material to cool.

* * * * *

UNITED STATES PATENT AND TRADEMARK OFFICE
CERTIFICATE OF CORRECTION

PATENT NO. : 10,227,238 B2
APPLICATION NO. : 11/397134
DATED : March 12, 2019
INVENTOR(S) : Batllo et al.

Page 1 of 1

It is certified that error appears in the above-identified patent and that said Letters Patent is hereby corrected as shown below:

In the Claims

In Column 9, Claim 4, Lines 60-61, delete "oxide coated" and insert --oxide-coated--

In Column 9, Claim 4, Line 61, delete "aluminum doped" and insert --aluminum-doped--

In Column 9, Claim 4, Line 62, delete "oxide coated" and insert --oxide-coated--

In Column 10, Claim 18, Line 53, delete "$AlO_3$" and insert --$Al_2O_3$--

Signed and Sealed this
Thirteenth Day of August, 2019

Andrei Iancu
*Director of the United States Patent and Trademark Office*